United States Patent [19]
Engel et al.

[11] 3,925,301
[45] Dec. 9, 1975

[54] PROCESS FOR THE CONTINUOUS PRODUCTION OF CARBON BLACK-SYNTHETIC RESIN CONCENTRATES

[75] Inventors: Claus Richard Engel, Bruhl; Heinz Linke, Grossauheim; Lothar Rothbühr, Hermulheim; Werner Sroka, Bruhl; Jes Vogt, Furtwangen; Hermann Westlinning, Kleinostheim, all of Germany

[73] Assignee: Deutsche Gold- und Silber-Scheideanstalt vormals Roessler, Germany

[22] Filed: June 27, 1974

[21] Appl. No.: 483,823

[30] Foreign Application Priority Data
June 29, 1973 Germany............................ 2333079

[52] U.S. Cl. ................. 260/42; 106/307; 259/191; 259/192; 260/37 R; 260/37 PC; 260/40 R; 264/211; 264/349

[51] Int. Cl.$^2$........................................... C08K 3/04
[58] Field of Search...... 260/42, 37 R, 37 PC, 40 R; 264/211, 349; 259/191, 192; 106/307

[56] References Cited
UNITED STATES PATENTS

| | | | |
|---|---|---|---|
| 2,540,146 | 2/1951 | Stober.................................. | 260/42 |
| 3,271,354 | 9/1966 | Weissert et al. ................. | 260/42.56 |
| 3,413,249 | 11/1968 | Luftglass et al...................... | 260/42 |

*Primary Examiner*—James H. Derrington
*Attorney, Agent, or Firm*—Cushman, Darby & Cushman

[57] ABSTRACT

Highly concentrated carbon black-thermoplastic synthetic resin concentrates are prepared by adding the carbon black to the synthetic resin in at least two places in series employing a conveying apparatus which is a continuously operating screw kneader.

13 Claims, No Drawings

PROCESS FOR THE CONTINUOUS PRODUCTION OF CARBON BLACK-SYNTHETIC RESIN CONCENTRATES

For the production of pigment containing synthetic resin articles there are used in increasing measure pigment-synthetic resin concentrates which the final operator brings to the desired concentration for use by dilution with uncolored synthetic resin.

In practice, for the production of concentrates of thermoplastic synthetic resins and pigments there are used discontinuous kneading machines, for example internal mixers and continuous kneading machines. Uni and double shafted continuous kneading machines especially are widespread. The process of the invention is in the range of the production of pigment-synthetic resin concentrates produced by the continuous kneading process. In this type of process until now thermoplastic polymers were brought up to the softening point in a lengthy trough by kneading energy or supplied heat, the pigment added further downstream and dispersed through passage of the kneading zone.

The increasing use of polyethylene and other synthetic resins for tubes, cables, etc. has brought to the foregoing the problem of stabilization against photochemical breakdown. By incorporating carbon black into the named polymers, the photochemical breakdown is largely prevented; furthermore, carbon black is also necessary for the pigmentation of various polymers.

For these reasons, considerable amounts of carbon black-synthetic resin concentrates are produced. Since, for example, the producers of carbon black containing synthetic resin tubes must give long time guarantees, these tubes can contain no defects. Therefore, tests are required which demonstrate that in the further working of the carbon black-synthetic resin concentrate into uncolored base synthetic resin only a minimum of nndispersed portion is formed.

To this requirement of carbon black concentrates with good carbon black distribution and good distributability in the base polymer, however, in practice there is added a second requirement. This requirement aims at having as high a carbon black content as possible to reduce transportation costs and to require a smaller storage space.

Both of the named requirements are in opposition while using the customary continuous kneading machines.

In experiments for the continuous production of concentrates of carbon black and high pressure polyethylene it has been shown that in industrially meaningful throughputs with the above described arrangements there cannot be exceeded a carbon black content of about 35%. At high dosages of carbon the carbon black is not completely taken up by the polymer; the result of this is a concentrate deficient in the carbon black distribution with unsatisfactory dispersion behavior and susceptibility of the apparatus to interruptions through clogging occurring at the place of addition of the carbon black. The process of the invention shows the feasibility of getting around these difficulties and producing qualitative, unobjectionably highly concentrated carbon black-thermoplastic synthetic resin concentrates with contents up to 50% of finely divided carbon black [even carbon black with particle sizes lower than 25μm (millimicron)] in continuous kneading machines. Thus, for example, the carbon black in the concentrate can be 40 to 50% although of course, the lower amounts of carbon black of the prior art, e.g., 35% can also be used.

The process of the invention is characterized in that the carbon black is added to the thermoplastic synthetic resin in at least two places in series in a conveying apparatus which is a continuously operating screw kneader. The carbon black can be added at 3, 4, or even more places.

An appropriate form of the process of the invention provides for the feeding of the synthetic resin and a part of the carbon black being fed in together to a first place of addition. Thus 10 to 80 % of the total amount of carbon black can be added at the first place. In the illustrative examples about 20 to 50% of the carbon black is added in the first place of addition specifically the amount of carbon black added at the first place of addition ranges from 22.2% in Example 1c to 50% in Example 2b.

The advantageous spacing for the successive individual carbon black additions naturally depends on the type of kneading machine used and the added materials used. As favorable ranges for these intervals there have been found 2 to 6 times the screw diameter, preferably 3 to 5 times the screw diameter.

As the thermoplastic synthetic resin there can be used, for example, olefin polymers such as polyethylene (high, low or medium density), polypropylene, ethylene-propylene copolymer or polyisobutylene, polystyrene, styrene-acrylonitrile copolymer, polyvinyl chloride, polyvinyl acetate, nylon 6, nylon 6,6, polyalkyl acrylates and methacrylates, e.g., polyethyl acrylate, polybutyl methacrylate, polymethyl methacrylate, polycarbonates, polyphenylene ethers, polytetrafluoroethylene, and polyethylene terephthalate.

Unless otherwise indicated all parts and percentages are by weight.

The invention is further explained in the following illustrative examples for the production of carbon black-polyethylene concentrates (Examples 1a to 1c and 4a to 4b), carbon black-polypropylene concentrates (Examples 2a to 2c) and carbon black-polystyrene concentrates (Examples 3a to 3c) wherein Examples 1a, 2a, 3a and 4a are comparison examples taken from the state of the art.

EXAMPLE 1a

In a continuous screw kneader (length 2,2 meters, diameter 20 cm) equipped with stationary kneader teeth and a shaft with an affixed endless screw impeller there were carried out experiments for the production of carbon black containing polyethylene concentrates. It is of importance to disperse the highest possible amount of carbon black in the polyethylene without disadvantageously influencing the carbon black distribution. Continuous screw kneaders of the above described form generally have one entrance for pigment (for example carbon black) to be worked in. The pigment entry is arranged downstream from the polymer entrance. Along with this there is intended a softening of the polyethylene by external heating or through kneader heat, before the pigment is added to the softened polymer mass.

The screw kneader was first used in the original concept. Thereby the polymer entrance was arranged about 100 cm before the pigment (carbon black) entrance. There was produced a concentrate consisting of 30% of carbon black (Corax P) and 70% high pressure polyethylene (Lupolen 1800 S).

Corax P is a furnace black with the following characteristics:

| | |
|---|---|
| Iodine adsorption according to ASTMD 1510-60 | 148 mg/g. |
| DBP (dibutyl phthalate) number according to ASTMD 2414-65 | 1.15 ml/g |
| Electron microscope particle diameter | 19 nanometers (nm) |
| Tamped density DIN (German Industrial Standard) 53194 | 380 g/l |

Lupolen 1800 S is a high pressure polyethylene having the following important distinctive characteristics:

| | |
|---|---|
| MFI (Melt Flow Index) (190/2) | 17–22 |
| Density | 0.918–0.920 g/ml. |

At the polymer entrance there were introduced 280 kg/h of Lupolen 1800 S and in the direction of flow downstream 100 cm. there were introduced 120 kg/h of Corax P. The number of revolutions of the screw kneader was 100 rpm (revolutions per minute). The carbon black concentrate with 30% Corax P could be produced without great difficulty. The quality of the product formed was judged by dilution of the concentrate to 2% carbon black content, production of microtome sections and counting the nondispersed portions. The size and number of the nondispersed pigment containing portions represents a measure of the quality.

| | |
|---|---|
| Largest nondispersed particles | 80 μm (Mikron) |
| Number of counted particles/2 cm² section | 10 |
| Average size of nondispersed portion | 19.7 μm (Mikron) |

It was also attempted under the same operating conditions to produce a concentrate containing 40% carbon black. Thereby it was tried to process 240 kg/h of Lupolen 1800 S and 160 kg/h of Corax P in the manner described above. However, it was already proven after a few minutes that under otherwise exactly the same operating conditions, the higher carbon black content could not be taken up by the polymer and a clogging of the entrance place for the carbon black took place.

EXAMPLE 1b

In order to overcome the difficulties in the production of a 40% carbon black - 60% polyethylene concentrate exhibited in Example 1a the pigment introduction (carbon black addition) on the same continuous screw kneader was changed as follows: The carbon black introduction was distributed in two partial streams whereby *the second partial stream was introduced 100 cm downstream. In the production of 40% Corax P — 60% Lupolen 1800 S there were introduced in the polymer addition tube (first partial stream introduction) 240 kg/h of Lupolen S and 50 kg/h of Corax P, 100 cm downstream the remainder of the 110 kg/h of Corax P (second partial stream introduction) were introduced into the continuous screw kneader. The revolutions were 100 rpm. Surprisingly there could be produced by this method of operation the carbon black - synthetic resin concentrate with high carbon black content without the previously described difficulties. The quality investigations gave a product having the following test data:

| | |
|---|---|
| Largest nondispersed particles | 80 μm (Mikron) |
| Number of counted particles/2 cm² section | 14 |
| Average size of nondispersed portion | 19.2 μm (Mikron) |

*) the introduction of the first partial stream.

There was attempted to produce in the same method of operation as Example 1b a concentrate having 50% of carbon black. Hereby it was attempted to introduce 200 kg/h of Lupolen 1800 S and 70 kg/h of Corax P in the polymer inlet as well as 130 kg/h of Corax P 100 cm downstream. Here it was proven after a short time that under the same conditions of operation the higher carbon black content could not be taken up by the polymer. Also, here there resulted a clogging of the pigment introduction tube (carbon black addition 2).

EXAMPLE 1c

In order to eliminate the difficulties mentioned in Example 1b with a 50% Corax P — 50% Lupolen 1800 S concentrate, the carbon black addition for this extremely high carbon black concentration was distributed between three places of addition.

180 kg/h of Lupolen 1800 S and 40 kg/h of Corax P were introduced in the polymer inlet tube; 100 cm downstream there were introduced 70 kg/h of Corax P and a further 100 cm downstream, there were introduced another 70 kg/h of Corax P. The revolutions were 100 rpm. By this method of operation even at the extremely high carbon black concentration there was no clogging; the carbon black was taken up by the polymer without difficulty. The reveiwing of the quality of the carbon black concentrate with that of the previously described processes resulted in the following test data:

| | |
|---|---|
| Largest nondispersed particles | 30 μm |
| Number of counted particles/2 cm² section | 6 |
| Average size of nondispersed portion | 17.7 μm |

EXAMPLE 2a

With the screw kneader described in Example 1a there was produced in the customary manner carbon black-synthetic resin concentrate from polypropylene and beaded Printex.

Beaded Printex is a high grade gas black having the following characteristics:

| | |
|---|---|
| BET - surface area | 100 m²/g |
| DBP number | 1.08 ml/g |
| Electron microscopic particle diameter according to ASTM 2414-65 | 25 nm (Nanometer) |
| Particle diameter Tamped density DIN 53194 | 400 ml/g |

Hostalen PPN 1060 is a polypropylene having a melt index (230/5) of 6–8. The kneader was operated with a carbon black addition 100 cm downstream of the polymer addition. The kneader revolutions were 100 rpm, the total throughput 400 kg/h. Hereby there could be produced a concentrate having a 30% carbon black content.

The test data were:

| | |
|---|---|
| Largest nondispersed particles | 70 μm |
| Number of counted particles/2cm² section | 122 |
| Average size of the nondispersed portions | 25.7 μm |

Higher carbon black concentrations could not be attained with the original concept of the machine and the use of Beaded Printex and Hostalen PPN as the added materials.

EXAMPLE 2b

To attain a higher carbon black concentration of the carbon black-synthetic resin concentrate described in Example 2a the carbon black addition was divided into two parts, wherein the first part (about 50% of the entire amount) was fed in in the polymer inlet and the residue fed in 100 cm. downstream. By this method of operation it was possible without further ado to increase the carbon black content to 40%. The kneader revolutions were 100 rpm, the entire throughput was 400 kg/h.

The following data was ascertained on the product produced:

| | |
|---|---|
| Largest nondispersed particles | 60 μm |
| Number of counted particles/2 cm² section | 54 |
| Average size of the nondispersed portion | 25.4 μm |

Besides the fact that only with the divided addition of carbon black there is possible the production of 40% Printex - Hostalen PPN batches, there must also be mentioned the improvement of the quality of the concentrate, which is especially clearly expressed in the number of counted particles.

EXAMPLE 3a

The previous examples are based on polyolefin batches. However, the process of the invention is also advantageously useful with other thermoplastics. There was produced with the previously characterized screw kneader carbon black concentrates from Corax L beads and polystyrene.

Corax L is a furnace black with the following specific properties:

| | |
|---|---|
| Iodine adsorption according to ASTM D 1510-60 | 160 mg/g |
| DPL-number according to ASTM D 2414-65 | 1.10 ml/g |
| Electron microscopic particle diameter | 23 nm |
| Tamping density | 410 g/l |

As the polymer there was used Vestyron N, a polystyrene having a melt index 200/5 of 3.6. The kneader was operated with a rotation of 100 rpm and a total throughput of 500 kg/h. With nondivided carbon black there was produced a 30% carbon black containing carbon black-synthetic resin having the following data:

| | |
|---|---|
| Largest nondispersed particles | 40 μm (micron) |
| Number of counted particles/2 cm² section | 15 |
| Average size of the nondispersed portion | 21.0 μm (micron) |

Higher carbon black concentrations could not be produced with this method of operation.

EXAMPLE 3b

With the same raw materials as described in Example 3a by dividing the carbon black stream into two places of addition (220 kg/h of polymer and 80 kg/h of carbon black at the place of polymer addition and 100 kg/h of carbon black 100 cm downstream thereof) on the contrary, it was possible to produce a 45% carbon black-synthetic resin concentrate without difficulties. The revolutions were 90 rpm, the total throughput 400 kg/h.

The following data was ascertained on the product produced:

| | |
|---|---|
| Largest nondispersed particles | 40 μm (microns) |
| Number of counted particles/2 cm² section | 10 |
| Average size of nondispersed portion | 17.0 μm (microns) |

EXAMPLE 4a

Besides the construction used in Examples 1a through 3b (continuous single screw kneader) there is a further known construction of a screw kneader. In this second construction, two screws lying side by side in two parallel running bore holes are intermeshed. The bores partially overlap so that an eight shaped prismatic hollow space is formed for reception of the screws in the screw cylinder. In a screw kneader of this construction in a first opening in the kneader housing at the beginning of the screw there was administered 138 kg/h of high pressure polyethylene Lupolen 1810H. The data for this polymer is:

| | | |
|---|---|---|
| MFI (190/2.16) | = | 1.2–1.7 g/10 min. |
| Density | = | 0.917–0.919 g/ml |

In a second kneader opening 48 cm from the place of polymer addition there were fed in a maximum of 32 kg/h of the already described carbon black Corax P. Thus was formed a carbon black-synthetic resin concentrate having a carbon black content of 19 weight % and the following properties:

| | |
|---|---|
| Largest nondispersed particles | 60 μm |
| Number of counted particles/2 cm² section | 43 |
| Average size of nondispersed portion | 38 μm |

When one tried to add more carbon black into the filling funnel than corresponding to the amounts stated, the filling funnel became filled up and ran over.

EXAMPLE 4b

Using the same raw materials as described in Example 4a, an increase in the carbon black concentrations was attained by arranging a second carbon black addition place 1 meter downstream from the first carbon black addition place. By this mode of action, it was possible at a polymer throughput of 138 kg/h to add 32 kg/h of carbon black at the first place of addition and a further 50 kg/h at the second place of addition. Therewith at a total throughput of 220 kg/h there was produced a carbon black-synthetic resin concentrate having a carbon black content of 37 weight %, for which the following characteristic properties were found:

| | |
|---|---|
| Largest nondispersed particle | 60 μm |
| Number of counted particles/2 cm² section | 47 |
| Average size of nondispersed portion | 30 μm |

From the foregoing examples it can be seen that the production of highly concentrated carbon black-synthetic resin concentrates with good carbon black dispersion becomes more difficult the higher the carbon black content (pigment content) of these concentrates will become. High carbon black contents, however, from the standpoint of storage and transportation are to be strived for. The conventional method for the addition of carbon black into the presoftened polymer mass does not lead to this goal. A simple and still surprising solution to this problem for one skilled in the art is the addition of the carbon black at several places spaced apart in a continuously operating kneader. In order to prevent the necessary kneading zone from becoming too long there can be used as the first place of addition for the carbon black the place of addition of the polymer in the customary kneading machine. As of greater advantage of the new method is the fact that with increasing number of places of addition with simultaneous raising of the carbon black concentration surprisingly the distribution of the carbon black is even better so that less and smaller undispersed portions are ascertained in the examination.

The real content of the process of the invention as is shown in Examples 4a and 4b is not limited to continuous single screw kneaders. Much more the process can also be carried out in other continuous screw kneaders with two or more screws or in other continuous kneading apparatus, if necessary after providing corresponding places of addition.

The ideas of the invention and the practical realizability also is not limited to the types of carbon black and thermoplastic resins in the illustrative examples. Practically all of the usual thermoplasts and carbon blacks can be worked in the described process to produce highly concentrated carbon black synthetic resin concentrates.

What is claimed is:

1. In a process for preparing highly concentrated carbon black-thermoplastic synthetic resin concentrates employing a continuous screw kneader in which kneading occurs, the improvement comprising adding the carbon black to the synthetic resin in at least two separate places in series in the conveying direction during the kneading, 10 to 80% by weight of the total carbon black being added in the first place of addition.

2. A process according to claim 1 wherein about 20 to 50% by weight of the total carbon black is added in the first place of addition.

3. A process according to claim 2 wherein the carbon black content of the concentrate is between 37 and 50% by weight.

4. A process according to claim 1 wherein the carbon black content of the concentrate is over 35% by weight.

5. A process according to claim 1 wherein the intervals between the places of addition of the carbon black are each 2 to 6 times the diameter of the screw.

6. A process according to claim 5 wherein the interval between the places of addition is 3 to 5 times the diameter of the screw.

7. A process according to claim 1 wherein the thermoplastic polymer is a hydrocarbon polymer.

8. A process according to claim 1 wherein the polymer is polyethylene, polypropylene or polystyrene 9. A process according to claim 1 wherein the first addition of carbon black is at the same place where the synthetic resin is added.

10. A process according to claim 1 wherein the carbon black is added at at least three different places, the carbon black content of the concentrate being about 50% by weight and the intervals between the places of addition of the carbon black being 2 to 6 times the diameter of the screw.

11. a process according to claim 1 wherein 22.2 to 50% by weight of the total carbon black is added at the first place of addition.

12. A process according to claim 1 wherein the carbon black content of the concentrate is between 37 and 50% by weight.

13. A process according to claim 1 wherein the carbon black content of the concentrate is between 35 and 50% by weight.

* * * * *